United States Patent
Fujimoto

(10) Patent No.: US 7,680,593 B2
(45) Date of Patent: Mar. 16, 2010

(54) MAP DATA UPDATING METHOD

(75) Inventor: Hidetoshi Fujimoto, Anjo (JP)

(73) Assignees: DENSO CORPORATION, Kariya (JP); Robert Bosch GmbH, Stuttgart (DE)

( * ) Notice: Subject to any disclaimer, the term of this patent is extended or adjusted under 35 U.S.C. 154(b) by 569 days.

(21) Appl. No.: 11/712,543

(22) Filed: Mar. 1, 2007

(65) Prior Publication Data

US 2007/0208505 A1   Sep. 6, 2007

(30) Foreign Application Priority Data

Mar. 3, 2006   (JP)   ................ 2006-57178

(51) Int. Cl.
*G01C 21/00* (2006.01)
(52) U.S. Cl. .............. 701/208; 701/200
(58) Field of Classification Search .............. 701/200, 701/208
See application file for complete search history.

(56) References Cited

U.S. PATENT DOCUMENTS

| 6,230,098 | B1 | 5/2001 | Ando et al. |
| 6,636,802 | B1 | 10/2003 | Nakano et al. |
| 2005/0149257 | A1 | 7/2005 | Linkohr |
| 2008/0262721 | A1 * | 10/2008 | Guo et al. ................ 701/208 |

FOREIGN PATENT DOCUMENTS

| EP | 1 300 654 | 4/2003 |
| EP | 1 329 692 | 7/2003 |
| JP | A-09-145383 | 6/1997 |
| JP | A-2002-175593 | 6/2002 |
| JP | A-2002-206938 | 7/2002 |
| JP | A-2005-003700 | 1/2005 |

OTHER PUBLICATIONS

European Extended Search Report issued on Jun. 22, 2007 in corresponding European application No. 07004134.8 (and English Translation).

* cited by examiner

*Primary Examiner*—Yonel Beaulieu
(74) *Attorney, Agent, or Firm*—Posz Law Group, PLC

(57) ABSTRACT

An information center has an all-road updating data and a main-road updating data. The all-road updating data is a difference of all roads extracted from an all-road map data, and the main-road updating map data is a difference of specified roads extracted from the all-road map data. A map display system executes a reverse-updating to return the map data to a previous state not updated with the main-road updated map data, when its map data has already been updated with the main-road updated map data. The map display system then executes updating of the map data with the all-road updated map data.

4 Claims, 6 Drawing Sheets

MAP DATA UPDATING METHOD

CROSS REFERENCE TO RELATED APPLICATION

This application is based on and incorporates herein by reference Japanese Patent Application No. 2006-57178 filed on Mar. 3, 2006.

FIELD OF THE INVENTION

The present invention relates to a map data updating method that retrieves a map updating data from an information center and updates a map data with the map updating data.

BACKGROUND OF THE INVENTION

Various methods of updating map data of a map display system such as a vehicle navigation system are proposed. In JP 2005-3700A, for instance, a map data is updated by retrieving a map updating data through a communication network.

In a case of traveling to a travel destination such as sight-seeing, spots and the like in accordance with a travel road guidance of a vehicle navigation system, a vehicle driver usually takes a main road such as an expressway or a state road and then takes a narrow road near the destination. In this case, a map data of the navigation system only needs the latest information about the main road with respect to area sections or zones (e.g., meshes) up to the destination, and does not need information about narrow roads around the main road. By delivering a map updating data without such unnecessary information, the amount of map updating data, communication cost and delivery time can be reduced.

It is therefore proposed that an information center has two types of map data. One is a latest map data including all roads and the other is a map data that includes latest information about main roads without narrow roads. By delivering map updating data from the information center in accordance with objectives or applications of a user, a map data of an area which a user needs can be updated efficiently.

For reducing the amount of map updating data, communication cost, delivery time and the like, it is further proposed to deliver the map updating data as difference information that is extracted as a difference of the latest map data from the previous map data.

The information center may thus have two types of map updating data. One is an all-road updating data that is a difference of all-road map data relative to all-road map data of all roads, and the other is main-road updating data that is a difference of a main-road map data relative to the all-road map data. The all-road updating data or the main-road updating data may be selectively delivered from the information center in accordance with objectives or applications of a user, and the map data of the map display system may be updated with the delivered map updating data. This map updating data delivery will cause complication of map updating data that is to be managed in the information center.

One example of version-up of a map data, that is, updating a map data, is shown in FIG. 9 as a sequence of updating a map data. In this figure, Va.m indicates a map data version number. In which "a" indicates a version number of an all-road map data and "m" indicates a version number of a main-road map data.

In FIG. 9, it is assumed in the information center that a main-road map data V0.1 is updated or generated first relative to an original version of an all-road map data V0.0 of all roads in the original state. Then, another main-road map data V0.2 is generated. Next, an all-road map data V1.0 is updated or generated relative to the all-road map data V0.0 in the original state. The all-road map data is generated by extracting a difference relative to the previous map data, that is, as difference information relative to a corresponding all-road map data in the previous state. The main-road map data is generated similarly as difference information relative to a corresponding main-road map data in the previous state.

When a map display system of a first vehicle requests updating to the all-road map data V1.0, for instance, the information center only needs to have a map updating data D1, which is a difference between the all-road map data V0.0 and the all-road map data V1.0.

In another case, a map display system of a second vehicle requests updating to the all-road map data V1.0 under the condition that the map data in the second vehicle has already been updated once with the main-road map data V0.1. In this case, the information center needs to have a map updating data D2, which is a difference between the main-road map data V0.1 and the all-road map data V1.0.

In still another case, a map display system of a third vehicle requests updating to the all-road map data V1.0 under the condition that the map data in the third vehicle has already been updated twice with the main-road map data V0.1 and the main-road map data V0.2. In this case, the information center needs to have a map updating data D3, which is a difference between the main-road map data V0.2 and the all-road map data V1.0.

Thus, the information center must manage each version of the all-road map data and of the main-road map data as difference information D. The information center further must have a multiple difference information D such as D1, D2, D3 of the vehicles depending on the update state in the vehicle. Thus, the information center must have a variety of difference information in correspondence to each version of the all-road map data and the main-road map data. This will complicate management of map updating data in the information center.

SUMMARY OF THE INVENTION

It is therefore an object of the present invention to simplify map data managed by an information center.

According to one aspect of the present invention, in updating a map data of a map display system, a map display system retrieves a first-road updating data or a second-road updating data from an information center. The first-road updating data is a difference of all roads extracted from the all-road map data covering all roads. The second-road updating data is a difference of specific-type roads extracted from the all-road map data. The map display system then checks whether the map data has already been updated with the second-road updating data, when updating the map data by retrieving the first-road updating data. The map display system executes a reverse updating to return the map data updated with the second-road updating data to a previous map data, which is before updated with the second-road updating data, when the map data has already been updated with the second-road updating data. The map display system then updates the map data with the first-road updating data after the reverse updating.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EMBODIMENT

Figure 1:
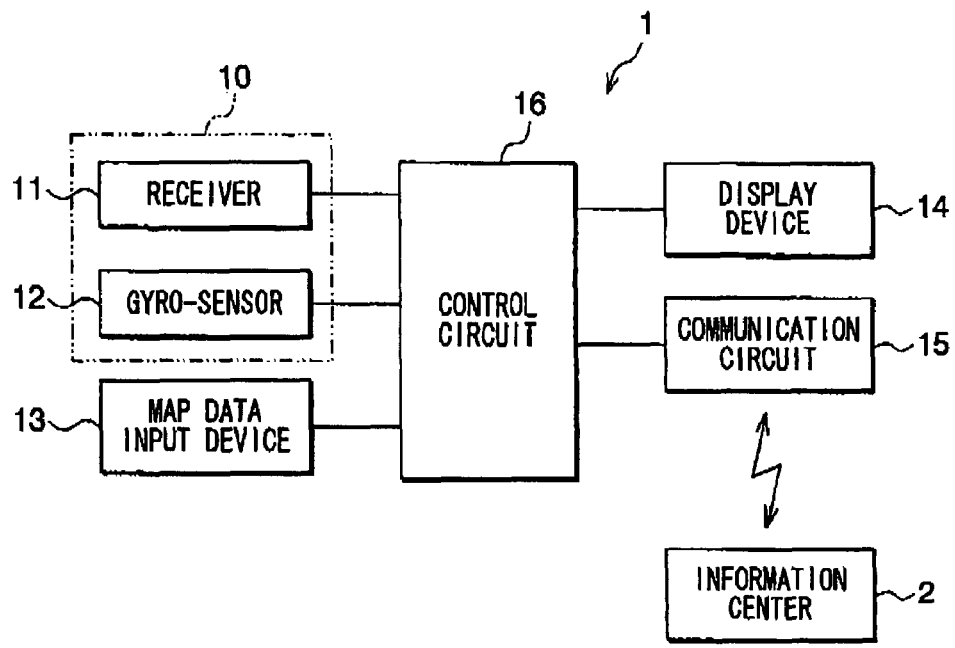
FIG. 1 is a block diagram showing a map display system in a vehicle and an information center according to an embodiment of the present invention.

Referring to FIG. 1, a map display system 1 is provided as a part of a navigation system of a vehicle (not shown). The map display system 1 is capable of radio communication with an information center 2, which is capable of delivering map data. The map display system 1 includes a position detection device 10, a map data input device 13, a display device 14, a communication circuit 15 and a control circuit 16. The control circuit 16 retrieves a map data from the information center 2 and updates its map data with the retrieved map data.

The position detection device 10 includes a GPS receiver 11 and a gyro-sensor 12. The GPS receiver 11 outputs vehicle present position information based on signals from GPS satellites (not shown). The gyro-sensor 12 outputs vehicle turning angle information and vehicle rolling angle information. The map data input device 13 retrieves map data from a data storage device storing map data. The data storage device includes a hard disk drive (HDD), which not only retrieves the map data but also writes the updated map data.

The display device 14 includes a display panel such as a liquid crystal panel to display images in correspondence to image signals applied from the control circuit 16. The communication circuit 15 is for radio communication with the external information center 2, which delivers map data. The control circuit 16 includes a microcomputer with a CPU and a memory. The CPU executes various processing as instructed by a control program stored in the memory.

The various processing, which the CPU executes, include determining a vehicle present position based on input signals from the position detection device 10, indicating a vehicle present position on a map showing an area around a vehicle, searching a recommended road to a destination in response to a user request, providing a travel road guidance in line with the recommended road, and the like.

The information center 2 has a map database that manages map data to be used by the map display system 1. This map database includes an all-road map data and two types of map updating data, which are an all-road updating data (first-road updating data) and a main-road updating data (second-road updating data). The all-road map data is an all-road map data in the original or initial state covering all roads. The all-road updating data is difference information of all roads relative to the all-road map data. The main-road updating data is difference information of main roads, which are of specified types, relative to a latest or newest all-road map data.

Figure 2:
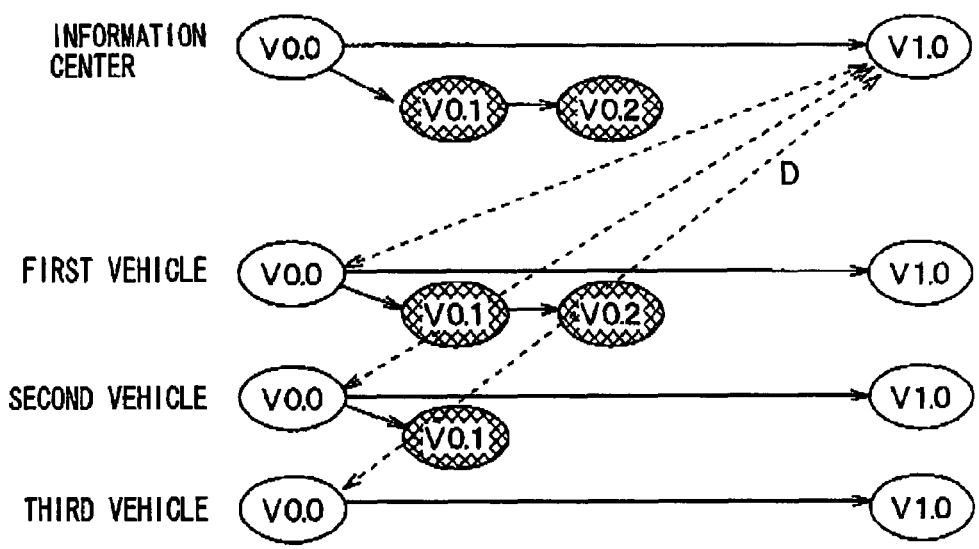
FIG. 2 is a schematic diagram showing a relation between all-road data, main-road data and map updating data.

As shown in FIG. 2, an all-road map data V1.0 (updated first time) is generated by extracting a difference D relative to the all-road map data V0.0, which is original. Although not shown, an all-road map data V2.0 (updated second time) is generated by extracting a difference relative to the all-road map data V1.0. On the other hand, a main-road map data V0.1 (updated first time) is generated by extracting a difference relative to the all-road map data V0.0. A main-road map data V0.2 (updated second time) is generated by extracting a difference relative to the main-road map data V0.1. Further, although not shown, a main-road map data V1.1 (updated first time) is generated by extracting a difference relative to the all-road map data V1.0. A main-road map data V2.1 (updated first time) is generated by extracting a difference relative to the all-road map data V2.0.

The main-road map data has no information about narrow roads, and hence its data amount is reduced in comparison to the all-road map data. The all-road map data and the main-road map data are updated separately from each other, when requested. At the time of updating, the map data is updated and managed in time series as a difference relative to the immediately previous version.

Figure 3:
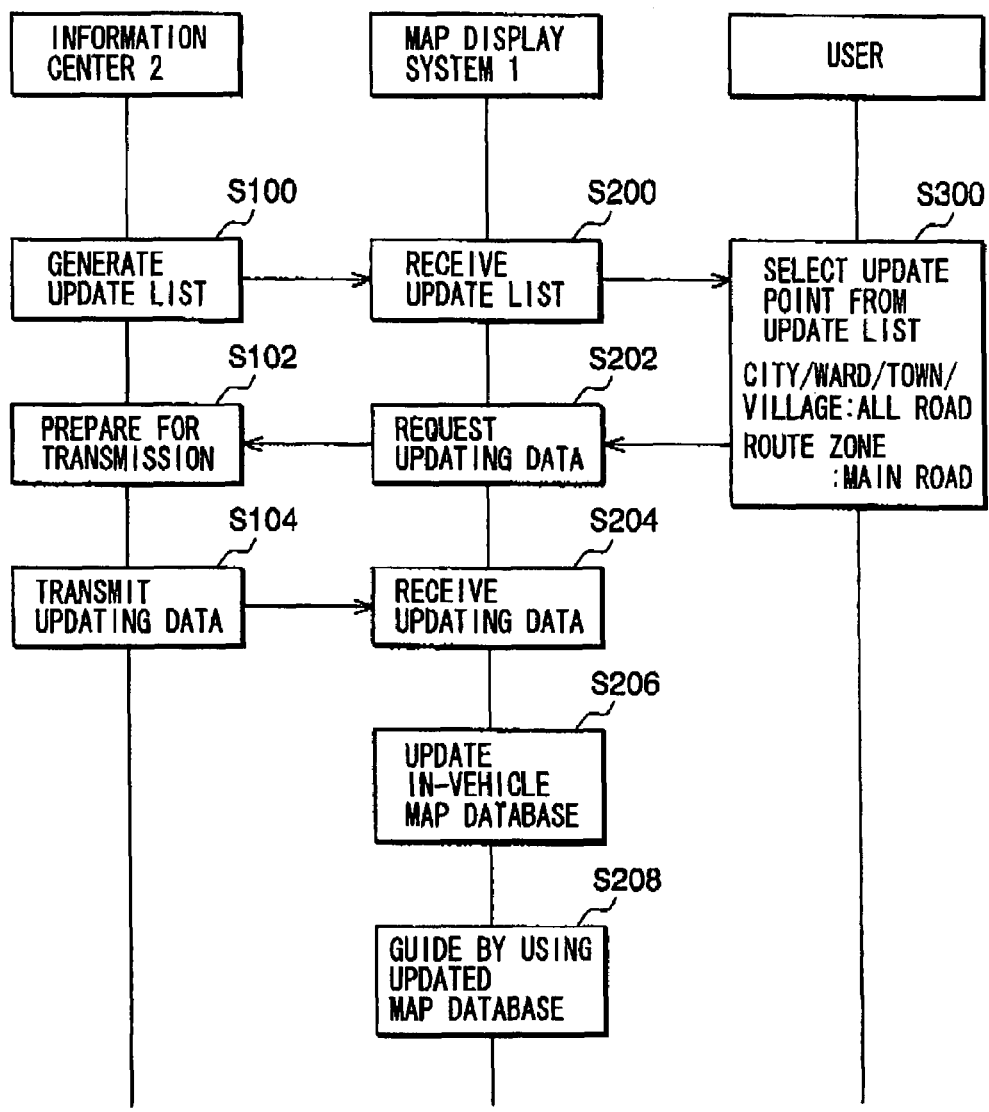
FIG. 3 is a sequence diagram showing operation processing of the map display system and the information center in the embodiment.

The map display system 1 and the information center 2 operate as shown in FIG. 3.

When the information center 2 updates map data, the information center 2 generates an update list indicating update contents at step S100 and transmits it to the map display system 1. The map display system 1 receives this update list at step S200 and causes the display device 14 to display on its display screen update methods and update points to be selected by a user.

The user selects an update method and an update point at step S300. For instance, if all-road updating is selected, an update point is then selected in unit of a predetermined section (e.g., city, town, village). If a main-road updating is selected, an update point is then selected in unit of a road zone (e.g., from X-point to Y-point of state road No. 23).

The map display system 1 then requests at step S202 map updating data based on the update method and the update point selected by the user. This map updating data request includes version information of the present map data of the map display system 1.

The information center 2 prepares for an updating data transmission in response to the request at sup S102. This step S102 specifies a map updating to be delivered by comparing the latest map data of the information center 2 with the update method, update location and the version information of the map data included in the request from the map display system 1. If the user selects the all-road map updating, the information center 2 transmits an all-road updating data of the selected predetermined zone. If the user selects the main-road updating, on the other hand, the information center 2 transmits a main-road updating data of a predetermined section (e.g., mesh) that includes the selected road zone.

In step 102, as understood from FIG. 2, a main-road updating data is prepared, if the map data of the map display system 1 is the original version map data V0.0 and the request from the display system 1 is an update to the map data V0.1. Another main-road updating data is prepared, if the map data of the map display system 1 is the updated map data V0.1 and the request from the display system 1 is an update to the map data V0.2. An all-road updating data is prepared, if the map data of the display system 1 has already been updated to the main-road map data V0.1, V0.2 and the request from the display system 1 is an update to the all-road map data V1.0. Although not shown in FIG. 2, another all-road updating data is prepared, if the map data of the display system 1 has already been updated with the main-road updating data V1.0 and the request from the display system 1 is an update to the all-road map data V2.0

The information center 2 then transmits the prepared map updating data to the map display system 1 at step S104.

When the map display system 1 receives the map updating data at step S204, it updates the map data of an in-vehicle map database at step S206 by using the received map updating data. If the user instructs vehicle travel road guidance to the destination, the map display system 1 executes the travel guidance by using the updated map database at step S208.

The map data updating operation (S206 in FIG. 3) of the map display system 1 (specifically control circuit 16) is described in detail with reference to FIG. 4.

When the map updating data from the information center 2 is received at step S400 (S204 in FIG. 3) through the communication circuit 15, it is stored in a memory and then checked at step S402 whether it is the main-road updating data. For this purpose, the map updating data transmitted from the information center 2 may include information that indicates the data type, that is, all-road updating data or main-road updating data.

If it is the all-road updating data and not the main-road updating data, it is checked at step 5404 whether the map data has already been updated with the main-road updating data. This checking may be executed by referring to the updated map data stored in the storage device of the map data input device 13.

If the map data has already been updated with the main-road updating data, a reverse updating is executed at step 5406 to revert the updated map data to the previous map data, which was before updating by the main-road updating data. Specifically, in this processing, information previously added by the main-road updating data is eliminated, information previously eliminated by the main-road updating data is restored, and information previously changed by the main-road updating data is restored.

Then it is checked at step S408 whether all map data have been updated in reverse. This checking may be attained by comparing with the latest all-road map data. This reverse updating at step S406 is repeated until the map data returns to the state that is updated by using the latest all-road updating data.

If the map data is successfully updated in reverse (YES at S408), this map data is updated at step 5410 with the all-road updating data received at step S400. It is then checked at step S412 whether the map data has been updated with all of the all-road updating data. This updating at step S410 is repeated until the map data is completed by using the all-road updating data of the latest version.

If updating the all-road map data is completed (YES at 5412), the all road updating data received from the information center 2 is stored in the storage device of the map data input device 13, thus ending the updating of the in-vehicle map database.

Figure 5:
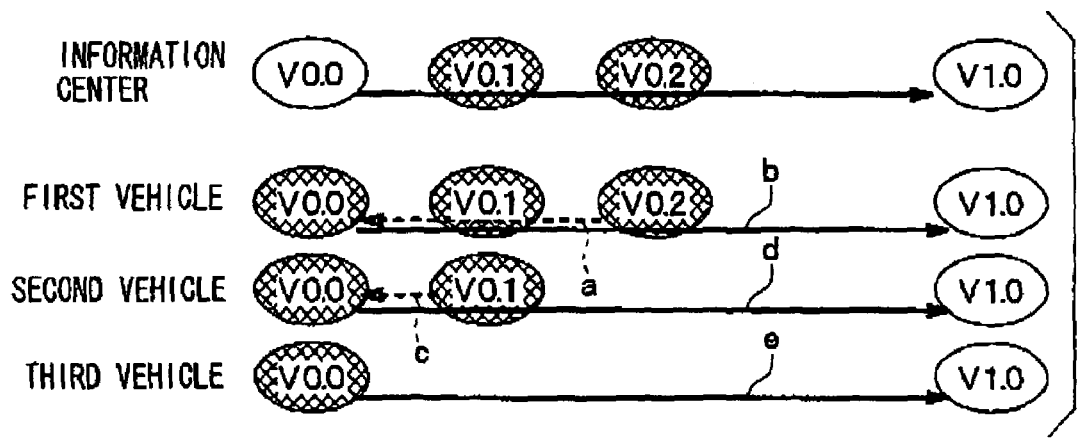
FIG. 5 is a schematic diagram showing version-up of a map data.

One example of version-up of each map data of the first, second and third vehicles is shown in FIG. 5.

When the original all-road map data V0.0 is updated with the main-road updating data, it becomes the map data V0.1. It becomes the map data V0.2 when it is further updated with the main-road updating data. When the original all-road map data V0.0 is updated with the all-road updating data, it becomes the map data V1.0.

Figure 4:
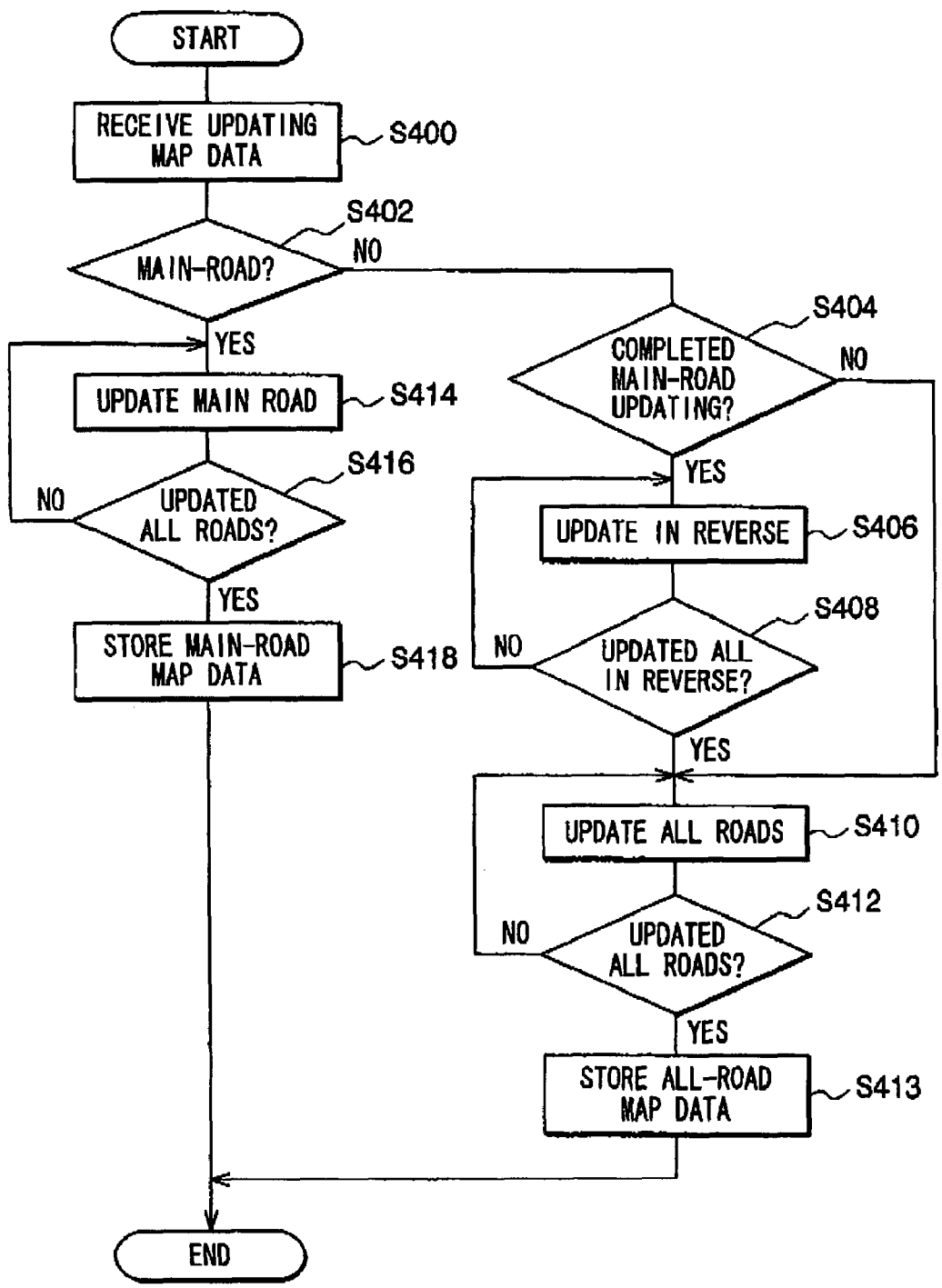
FIG. 4 is a flow diagram showing map updating processing by a control circuit of the map display system.

Therefore, if the map data of the map display system 1 of the first vehicle is to be updated to the map data V1.0 from the map data V0.2, the version of the map data is updated in reverse (step S406) to return to the version V0.1 and then V0.0 as shown with "a" in FIG. 4. This map data (original version) V0.0 is then updated (S410) with the all-road updating data to the map data V1.0 as shown with "b."

In the case of the second vehicle, if the map data is to be updated to the map data V1.0 of the all-road map data after having been updated to the map data V0.1, it is updated in reverse (S406) to the original map data V0.0 as shown with "c". This map data is then updated (S410) with the all-road updating data to the map data V1.0 as shown with "d."

Although not shown in FIG. 5, if the map data is to be updated to the map data V2.0 of the all-road map data after having been updated to the map data V1.1, it is updated in reverse (S406) to the map data V1.0 updated with the latest all-road updating data. This map data is then updated (S410) with the all-road updating data to the map data V2.0.

If no updating of the map data with the main-road updating data has been executed, the reverse-updating of step S406 in FIG. 4 is not executed. This case is shown in FIG. 5 as the third vehicle, in which the version of the map data is updated directly from the map data V0.0 to map data V1.0 as shown with "e" by step S413.

When the main-road updating data is received from the information center 2 at step S400, the main-road updating is executed at step S414 to update the map data with the received main-road updating map data. For example, when the map display system 1 in the first vehicle updates the version from the original map data V0.0 to map data V0.2 of the main-road map data as shown in FIG. 5, the map data V0.0 is updated by using the main-road updating data V0.1 and then using the main-road updating data V0.2 Thus, if map data updating is executed while skipping some versions, the updating is executed by updating also all the intermediate versions. In the case of the first vehicle, the intermediate version is map data V0.1, which is between the map data V0.0 and V0.2.

Next, it is checked at step S416 whether all map data has been updated. This checking may be executed by checking whether the map data has been updated by using all of the main-road updating data received from the information center 2. The map data updating at step S414 is repeated until the map data is fully updated by using all of the received main-road updating data. If this map data updating is completed (YES at S416), the updated map data is stored in the storage device of the map data input device 13 at step S418, thus ending the updating of the in-vehicle map database.

According to the above embodiment, the map data can be updated with respect to only some sections, which a user needs to update, because the point of updating the map data can be selectable by the user at step S300 in FIG. 3.

Figure 6:
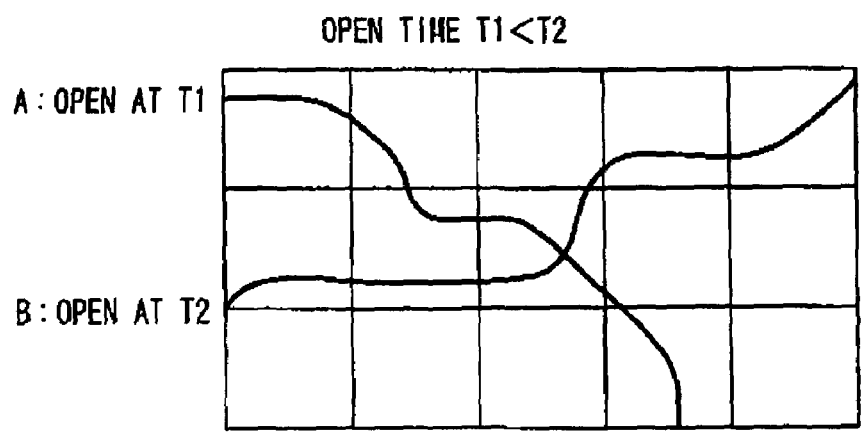
FIG. 6 is an explanatory diagram showing updating of a map data in case of updating a main road in each section.
Figure 7A:
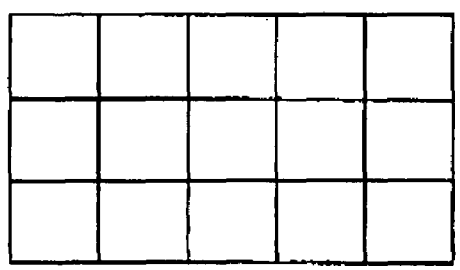
FIGS. 7A to 7D are explanatory diagrams showing updating of a map data in sequence in case of updating a main road in each section.
Figure 7B:
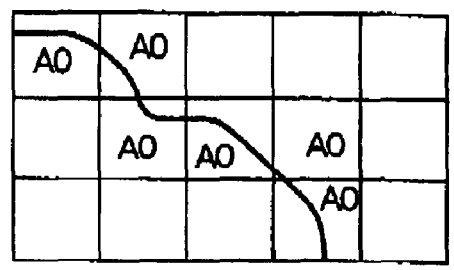
Figure 7C:
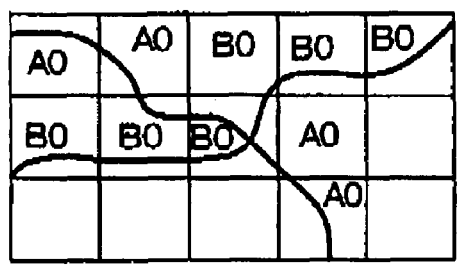
Figure 7D:
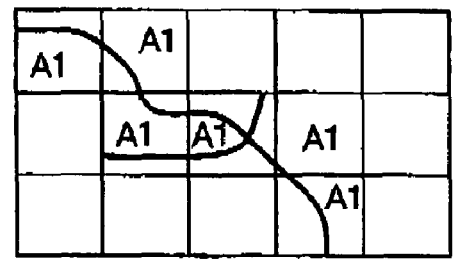

It is assumed here that a new road A opens or becomes available at time T1 and then another new road B opens at time B as shown in FIG. 6. In this instance, the information center 2 makes a first version-up of the map data in the original state shown in FIG. 7A by generating a main-road updating data of sections (meshes) A0 as shown in FIG. 7B. The sections A0 correspond to areas, where the road A is provided. Then the information center 2 makes a second version-up of the map data by further generating a main-road updating data of sections (meshes) B0 as shown in FIG. 7C. The sections B0 correspond to areas, where the road B is provided.

It is further assumed that, after the user has updated the map data of the map display system 1 with regard to the road A by updating the sections A0 as shown in FIG. 7B, the information center 2 updated the map data of the sections B0 as shown in FIG. 7C. When the user wants to update the main-road map data, the user may opt to receive the main-road updating data of only sections A1 as shown in 7D instead of receiving the map data of all the sections B0 shown in FIG. 7C. In this instance, the resulting map data includes the road A entirely and the road B partly.

According to the above embodiment, the information center 2 has an all-road updating data and a main-road updating data. The all-road updating map data is a difference of all roads extracted from the all-road map data covering all roads. The main-road updating map data is a difference of a specific-type road extracted from the all-road map data. When the map display system 1 updates its map data by retrieving the all-road updating map data from the information center 2, it chews whether the map data has already been updated with the main-road updating map data. If it has been updated with the main-road updating data, the map display system 1 executes a reverse-updating to return the map data updated with the main-road updating map data to the previous map data, which is before being updated, and then updates the map data by using the received all-road updating map data. The information center 2 therefore only needs to manage difference information of each version of the main-road updating data and the all-road updating data. As a result, the map updating data to be managed by the information center 2 can be simplified and cost of running the information center 2 can be reduced.

Further, the map data can be updated by selectively retrieving either the all-road updating data or the main-road updating data from the information center 2 based on the user's selection operation. Therefore, for instance, the map data can be updated by retrieving from the information center 2 the first-road updating map data with respect to sections near the destination and by retrieving the second-road updating map data with respect to intermediate sections. The unnecessary updating map data such as narrow roads around the main roads in the intermediate sections need not be retrieved. As a result, the amount of the map updating data, communication cost and delivery time can be reduced.

The above embodiment may be modified in the following ways, which are only exemplary.

The map display system 1 need not be constructed as a navigation system. The map input device 13 need not be a HDD but may be a flash memory or the like, which is capable of reading and writing data.

Figure 8:
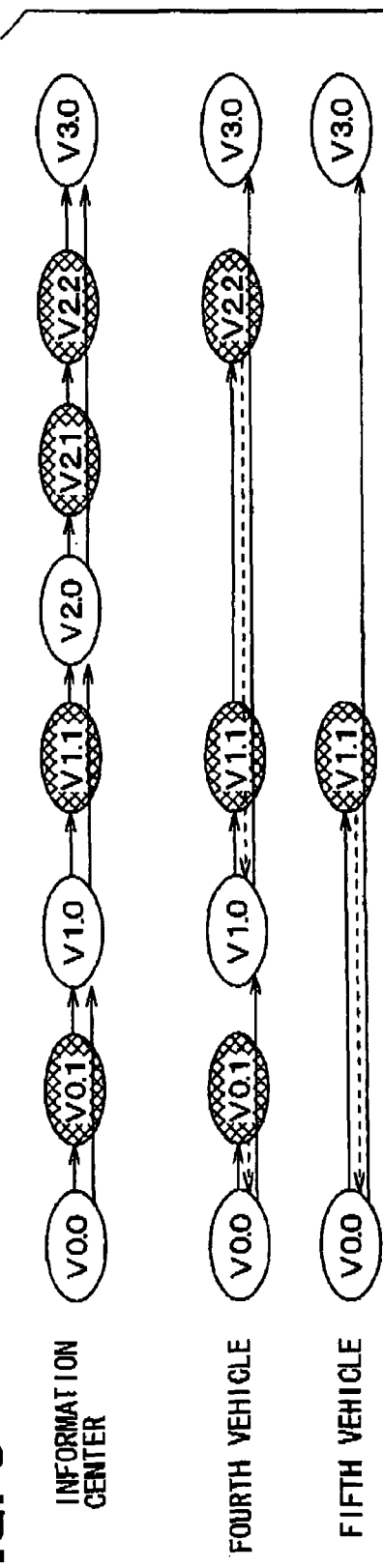
FIG. 8 is a schematic diagram showing another version-up of a map data.
Figure 9:
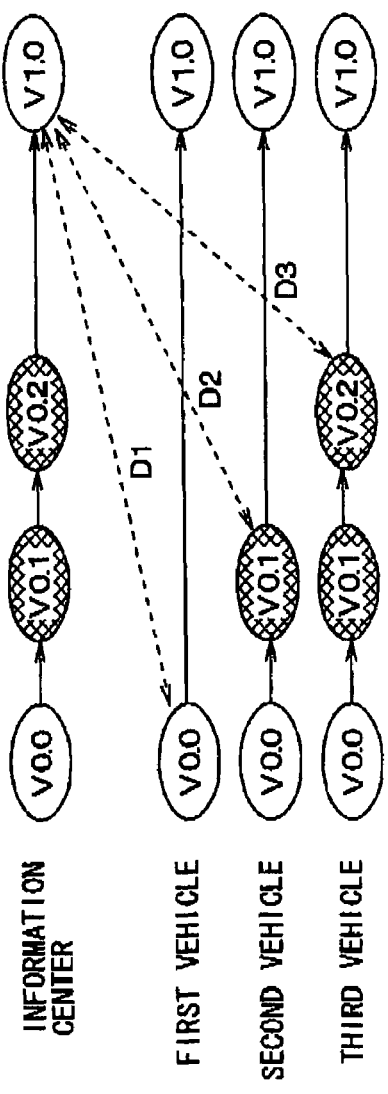
FIG. 9 is a schematic diagram showing a relation between all-road map data, main-road data and map updating data in a related art.

As shown in FIG. 8, in the case of updating the map data having already been updated with the main-road updating data, the reverse updating (S406) need not be executed until the map data returns to the state updated with the latest all-road updating data. For instance, in updating the map data from a map data V2.2 to a map data V3.0 by a fourth vehicle, the map data need not be reverse-updated to the map data V2.0 by step S406. In this instance, the map data may be returned to the map data V1.0 by step S406 and then updated with the all-road updating map data V2.0, V3.0. Further, when the map data is updated from V1.1 to V3.0 by a fifth vehicle, the map data may be returned to the original map data V0.0 and then updated with the all-road updating map data V1.0, V2.0 and V3.0.

Still further, the specific-type road should not be limited to the main road but may be other roads such as an expressway, state road, county road, etc.

What is claimed is:

1. A map data updating method comprising:
   retrieving from an information center a first-road updating data or a second-road updating data, the first-road updating data being a difference of all roads extracted from an all-road map data covering all roads and the second-road updating data being a difference of specific-type roads extracted from the all-road map data; and
   updating a map data of a map display system with retrieved updating data, wherein the updating includes
      checking whether the map data of the map display system has already been updated with the second-road updating data, when updating the map data by retrieving the first-road updating map data,
      executing a reverse-updating to return the map data updated with the second-road updating data to a previous map data, which is before being updated with the second-road updating data, when the map data has already been updated with the second-road updating map data, and
      updating the map data with the first-road updating data after the reverse-updating.

2. The map data updating method according to claim 1, wherein the map data is updated with the first-road updating map data without the reverse-updating, when the map data has not been updated with the second-road updating data, 3. The map data updating method according to claim 1, wherein the map data is updated with the second-road updating data without the reverse-updating, when the first-road is not updated.

4. The map data updating method according to claim 2, wherein the map data is updated with the second-road updating data without the reverse-updating, when the first-road is not updated.

* * * * *